United States Patent
Nakatani

(10) Patent No.: US 12,442,813 B2
(45) Date of Patent: Oct. 14, 2025

(54) ELECTRODE SUBSTRATE, MEASURING DEVICE, REMOVAL TOOL, AND MEASURING METHOD

(71) Applicant: SCREEN HOLDINGS CO., LTD., Kyoto (JP)

(72) Inventor: Noriyuki Nakatani, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 1000 days.

(21) Appl. No.: 17/433,569

(22) PCT Filed: Jan. 10, 2020

(86) PCT No.: PCT/JP2020/000743
§ 371 (c)(1),
(2) Date: Aug. 24, 2021

(87) PCT Pub. No.: WO2020/174897
PCT Pub. Date: Sep. 3, 2020

(65) Prior Publication Data
US 2022/0146490 A1   May 12, 2022

(30) Foreign Application Priority Data
Feb. 26, 2019  (JP) ................. 2019-032505

(51) Int. Cl.
   *G01N 33/483* (2006.01)
   *G01N 27/12* (2006.01)
   *G01N 27/327* (2006.01)

(52) U.S. Cl.
   CPC ....... *G01N 33/4836* (2013.01); *G01N 27/125* (2013.01); *G01N 27/327* (2013.01)

(58) Field of Classification Search
   CPC ...... G01N 27/04; G01N 27/045; G01N 27/12; G01N 27/125; G01N 27/327; G01N 33/48–48707; G01N 33/48735
   See application file for complete search history.

(56) References Cited

U.S. PATENT DOCUMENTS

2012/0083711 A1* 4/2012 Goldstein ............ A61B 5/4848
                                                                600/573
2013/0296664 A1* 11/2013 Frey ..................... A61B 5/6846
                                                                 29/846

(Continued)

FOREIGN PATENT DOCUMENTS

CN   106461587 A   2/2017
JP   H02-53753 U   4/1990

(Continued)

OTHER PUBLICATIONS

International Search Report and Written Opinion issued in corresponding International Patent Application No. PCT/JP2020/000743, dated Mar. 24, 2020, with partial translation.

(Continued)

*Primary Examiner* — James Lin
*Assistant Examiner* — Vivian A Tran
(74) *Attorney, Agent, or Firm* — Rimon P.C.

(57) ABSTRACT

A technique for measuring the electrical resistance of biological cells or tissues with high efficiency and with high accuracy is provided. An electrode substrate includes: a substrate having a base section, a first extension part extending from the base section, and a second extension part extending from the base section; a plurality of connection terminals provided on a first main surface of the substrate; a first working electrode and a second working electrode each connected to one of said connection terminals, the first and second working electrodes being wired on the first main surface of the substrate; and an engagement surface pro- (Continued)

vided on the substrate and facing toward the connection terminals in a position closer to the first extension part than the connection terminals. The first working electrode is wired from the base section to the first extension part. The second working electrode is wired from the base section to the second extension part.

14 Claims, 14 Drawing Sheets

(56) References Cited

U.S. PATENT DOCUMENTS

| | | |
|---|---|---|
| 2014/0045252 A1 | 2/2014 | Nakajima et al. |
| 2015/0338359 A1* | 11/2015 | Baxi .................. G01N 27/07 324/693 |
| 2017/0067015 A1 | 3/2017 | Moreno et al. |
| 2018/0326417 A1 | 11/2018 | Wikswo et al. |
| 2019/0271659 A1* | 9/2019 | Yang .................. G01N 27/3278 |

FOREIGN PATENT DOCUMENTS

| | | | |
|---|---|---|---|
| JP | 2005-137307 A | | 6/2005 |
| JP | 2006-541 A | | 1/2006 |
| JP | 2009-27928 A | | 2/2009 |
| KR | 20150030495 A | * | 3/2015 |
| WO | 2012/147463 A1 | | 11/2012 |
| WO | 2013/012498 A1 | | 1/2013 |

OTHER PUBLICATIONS

Sheller, Rebecca A. et al., "Comparison of transepithelial resistance measurement techniques: Chopsticks vs. Endohm," Biological Procedures Online, 2017, vol. 19; 4, pp. 1-5.

European Search Report of corresponding European Patent Application No. 20762477.6 dated Apr. 19, 2022 (8 pages).

* cited by examiner

ELECTRODE SUBSTRATE, MEASURING DEVICE, REMOVAL TOOL, AND MEASURING METHOD

CROSS-REFERENCE OF RELATED APPLICATIONS

This application is the U.S. National Phase under 35 U.S.C. § 371 of International Patent Application No. PCT/JP2020/000743, filed on Jan. 10, 2020, which in turn claims the benefit of Japanese Patent Application No. 2019-032505, filed on Feb. 26, 2019, the entire disclosures of which Applications are incorporated by reference herein.

TECHNICAL FIELD

The present invention relates to a technique for measuring the electrical resistance of biological cells or tissues.

BACKGROUND ART

There has been known a technique for measuring the electrical resistance of biological cells or tissues for purposes of investigating the property or state of the cells or tissues. For example, in transepithelial electrical resistance (TEER) measurement, electrodes are disposed on one side and the other side of a membrane for cell culture in a culture solution to measure electrical resistance, thereby measuring the electrical resistance of the cells themselves cultured in the form of the membrane.

Patent Literature 1 discloses a technique for measuring the electrical resistance of cells by immersing elongated chopstick-shaped electrodes in a culture solution. Patent Literature 2 discloses a technique for measuring electrical resistance while maintaining a culture environment, with electrodes provided in a lid part of a culture vessel and inside the vessel.

CITATION LIST

Patent Literature

Patent Literature 1: Japanese Patent Application Laid-Open No. 2005-137307
Patent Literature 2: Japanese Patent Application Laid-Open No. 2009-27928

SUMMARY OF INVENTION

Technical Problem

It is known that when precipitates generated in a culture solution adhere to the electrodes during the measurement of electrical resistance, the measurement results become unstable. In the case of Patent Literature 2, for example, there is a danger that the electrodes are contaminated due to prolonged measurement, which in turn results in a danger that accurate measurement is difficult. In the case of Patent Literature 1, the technique requires complicated operations such as cleaning the electrodes each time the electrodes are contaminated.

It is therefore an object of the present invention to provide a technique for measuring the electrical resistance of cells or tissues with high efficiency and with high accuracy.

Solution to Problem

To solve the aforementioned problem, a first aspect of the present invention is intended for an electrode substrate having electrodes for measuring an electrical resistance of biological cells or tissues. The electrode substrate comprises: a substrate having a base section, a first extension part extending from the base section, and a second extension part extending from the base section; a plurality of connection terminals provided on a surface of the base section; a first working electrode and a second working electrode each connected to one of the connection terminals, the first and second working electrodes being wired on a surface of the substrate; and an engagement surface provided on the substrate and facing toward the connection terminals in a position closer to the first extension part than the connection terminals, the first working electrode being wired from the base section to the first extension part, the second working electrode being wired from the base section to the second extension part.

A second aspect of the present invention is intended for the electrode substrate of the first aspect, wherein the engagement surface is provided on an engagement part provided on a side edge of the substrate and having a protruding or recessed shape.

A third aspect of the present invention is intended for the electrode substrate of the second aspect, wherein the engagement part is provided in the base section.

A fourth aspect of the present invention is intended for the electrode substrate of the second or third aspect, wherein the first extension part extends in a first direction from a side edge of the base section, and wherein the engagement part has a shape protruding or recessed in a second direction orthogonal to the first direction.

A fifth aspect of the present invention is intended for the electrode substrate of the fourth aspect, which further comprises a first reference electrode and a second reference electrode each connected to one of the connection terminals, the first and second reference electrodes being wired on the surface of the substrate.

A sixth aspect of the present invention is intended for the electrode substrate of the fifth aspect, wherein the first reference electrode is wired from the base section to the first extension part.

A seventh aspect of the present invention is intended for the electrode substrate of the sixth aspect, wherein the first working electrode is wired on one main surface of the first extension part, and wherein the first reference electrode is wired on the other main surface of the first extension part.

An eighth aspect of the present invention is intended for the electrode substrate of any one of the fifth to seventh aspects, wherein the base section has a through hole, and wherein one of the first working electrode and the first reference electrode is wired from one main surface of the base section through the through hole onto the other main surface of the base section.

A ninth aspect of the present invention is intended for a measuring device for measuring an electrical resistance of biological cells or tissues. The measuring device comprises: an electrode substrate having electrodes; and a relay section to which the electrode substrate is to be removably attached, wherein the electrode substrate includes a substrate having a base section, a first extension part extending from the base section, and a second extension part extending from the base section, a plurality of connection terminals provided on a surface of the base section, a first working electrode and a second working electrode each connected to one of the connection terminals, the first and second working electrodes being wired on a surface of the substrate, and an engagement surface provided on the substrate and facing toward the connection terminals in a position closer to the first extension part than the connection terminals, the first working electrode being wired from the base section to the first extension part, the second working electrode being wired from the base section to the second extension part, and wherein the relay section includes a plurality of contact parts for contact with the respective connection terminals.

A tenth aspect of the present invention is intended for the measuring device of the ninth aspect, wherein the relay section further includes an insertion port for insertion of the base section of the electrode substrate therein, and wherein the contact parts are provided inside the insertion port.

An eleventh aspect of the present invention is intended for the measuring device of the tenth aspect, wherein the engagement surface of the electrode substrate is exposed to the outside of the insertion port, with the base section of the electrode substrate inserted in the insertion port of the relay section.

A twelfth aspect of the present invention is intended for the measuring device of any one of the ninth to eleventh aspects, wherein the contact parts provided in the relay section are provided in conformity with an SD standard.

A thirteenth aspect of the present invention is intended for a removal tool for removing the electrode substrate from the relay section in a measuring device as recited in any one of the ninth to twelfth aspects. The removal tool comprises a removal part provided with an opening part for insertion of the electrode substrate therein, wherein the opening part includes a first opening greater than part of the electrode substrate where the engagement surface is provided, and a second opening continuous with the first opening and smaller than the part of the electrode substrate where the engagement surface is provided.

A fourteenth aspect of the present invention is intended for a measuring method for measuring an electrical resistance of biological cells or tissues by means of a measuring system, the measuring system including an electrode substrate, a relay section to which the electrode substrate is to be attached, and a removal tool for removing the electrode substrate from the relay section, the electrode substrate including a substrate having a base section, a first extension part extending from the base section, and a second extension part extending from the base section, a plurality of connection terminals provided on a surface of the base section, a first working electrode and a second working electrode each connected to one of the connection terminals, the first and second working electrodes being wired on a surface of the substrate, and an engagement surface provided on the substrate and facing toward the connection terminals in a position closer to the first extension part than the connection terminals, the removal tool including a removal part provided with an opening part for insertion of the electrode substrate therein, the opening part including a first opening greater than part of the electrode substrate where the engagement surface is provided, and a second opening continuous with the first opening and smaller than the part of the electrode substrate where the engagement surface is provided. The method comprises the steps of: a) inserting the part of the electrode substrate where the engagement surface is provided into the first opening, with the electrode substrate attached to the relay section; b) moving the electrode substrate to the inside of the second opening, the step b) being performed after the step a); and c) withdrawing the electrode substrate from the second opening to bring the second opening into engagement with the engagement surface, the step c) being performed after the step b).

Advantageous Effects of Invention

According to the first aspect, the first working electrode and the second working electrode are electrically connected through the connection terminals of the electrode substrate to the relay section of the measuring device. Thus, the replacement of the electrodes is achieved by the replacement of the electrode substrate. Also, the provision of the engagement surface facing toward the connection terminals side on the electrode substrate allows the engagement part to be urged in a direction opposite the connection terminals while the removal tool is in engagement with the engagement surface. This facilitates the removal of the electrode substrate connected to the relay section. Therefore, the electrical resistance of the cells or tissues is measured with high efficiency and with high accuracy because the replacement of the electrodes is facilitated.

According to the second aspect, the removal of the electrode substrate from the relay section is facilitated by bringing the removal tool into engagement with the engagement part having the protruding or recessed shape.

According to the third aspect, when the engagement part is provided in the base section, the deformation of the substrate is reduced if the removal tool is in engagement with the engagement surface and a force is applied thereto.

According to the fourth aspect, the electrode substrate is urged in the first direction by bringing the removal tool into engagement with the engagement part. This allows the electrode substrate to be removed from the relay section in the first direction.

According to the fifth aspect, the electric potential applied to the cells or tissues is measured between the first reference electrode and the second reference electrode. Since the electric potential applied between the first reference electrode and the second working electrode is determined from this measurement value, the electrical resistance of the cells or tissues is measure more accurately.

According to the sixth aspect, the electrode substrate is reduced in size because the first working electrode and the first reference electrode are provided on the common first extension part.

According to the seventh aspect, the electrodes are placed on the main surfaces on both sides of the first extension part, whereby regions of the respective main surfaces are effectively used. Also, the first working electrode and the first reference electrode are insulated by the first extension part. In addition, the first working electrode and the first reference electrode are disposed close to each other.

According to the eighth aspect, the electrodes are wired on the main surfaces on both sides of the base section, whereby regions of the respective main surfaces are effectively used.

According to the ninth aspect, the electrode substrate, which includes the plurality of connection terminals, is attachable to and removable from the relay section, so that the replacement of the electrodes is facilitated. Also, the provision of the engagement surface facing toward the connection terminals on the electrode substrate allows the electrode substrate to be urged in a direction opposite the connection terminals while the removal tool is in engagement with the engagement surface. This facilitates the removal of the electrode substrate connected to the relay section through the connection terminals. Therefore, the electrical resistance of the cells or tissues is measured with high efficiency and with high accuracy because the replacement of the electrodes is achieved by the replacement of the electrode substrate.

According to the tenth aspect, the connection terminals provided on the electrode substrate are brought into contact with the contact parts of the relay section by inserting the electrode substrate into the insertion port of the relay section. This facilitates the attachment of the electrode substrate to the relay section.

According to the eleventh aspect, the removal tool is brought into engagement with the engagement surface of the electrode substrate inserted into the insertion port of the relay section because the engagement surface is exposed to the outside of the insertion port.

According to the twelfth aspect, an adapter in conformity with SD standards can be used for the relay section. This reduces the manufacturing costs of the measuring device.

According to the thirteenth aspect, part of the engagement surface of the electrode substrate is inserted into the first opening. Thereafter, the electrode substrate is moved to the inside of the second opening, and is then withdrawn. Thus, the engagement surface is brought into engagement with the removal part. This allows the removal of the electrode substrate from the relay section.

According to the fourteenth aspect, the part of the electrode substrate where the engagement surface is provided is inserted into the first opening. Thereafter, the electrode substrate is moved to the second opening, and is then withdrawn. Thus, the second opening is brought into engagement with the engagement surface. This facilitates the removal of the electrode substrate connected to the relay section. Therefore, the electrical resistance of the cells or tissues is measured with high efficiency and with high accuracy because the replacement of the electrodes is facilitated.

DESCRIPTION OF EMBODIMENTS

Figure 1:
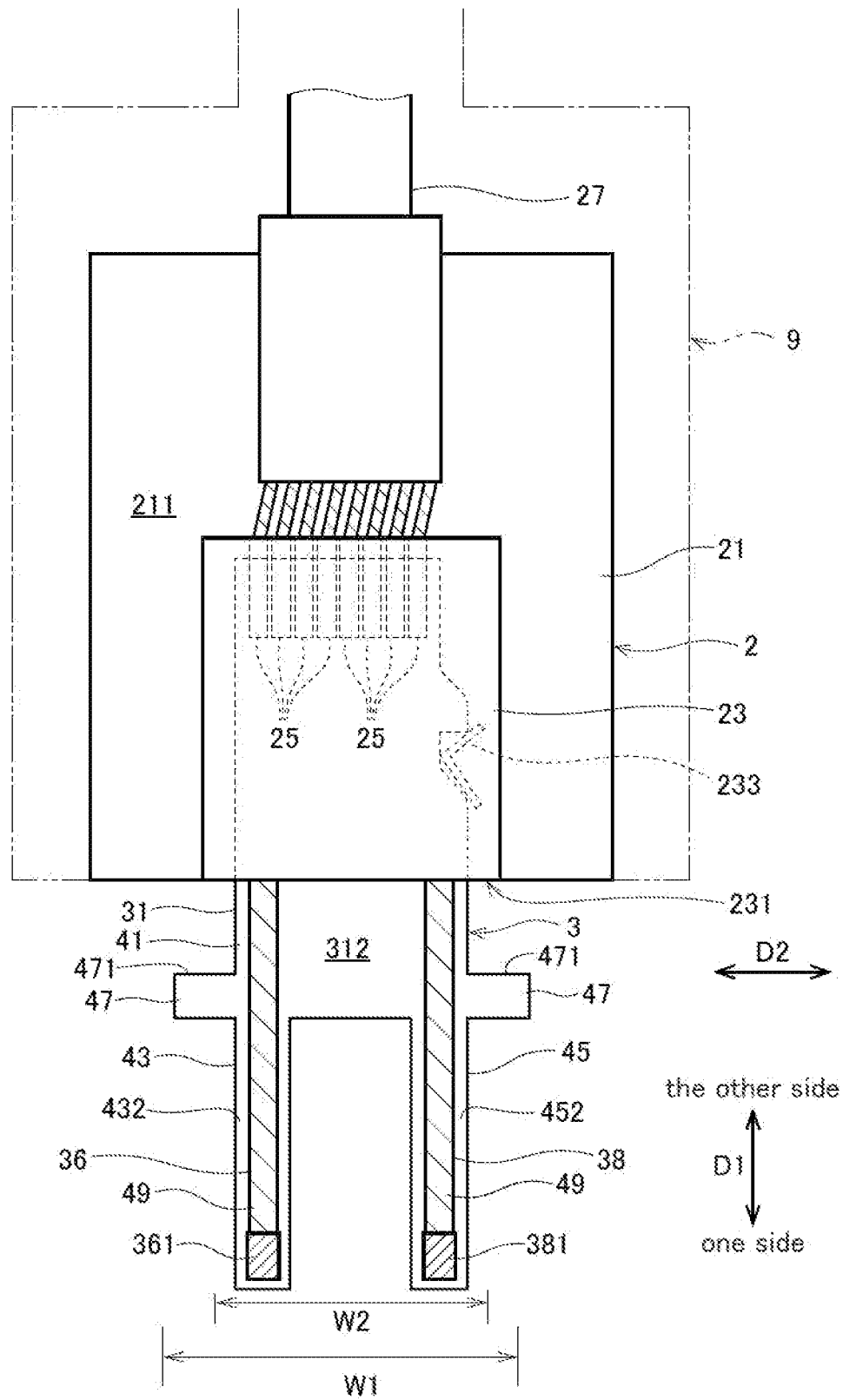
FIG. 1 is a view showing a measuring device.

An embodiment according to the present invention will now be described with reference to the drawings. Components described in the embodiment are merely illustrative, and there is no intention to limit the scope of the present invention thereto. In the drawings, the dimensions of components and the number of components are shown in exaggeration or in simplified form, as appropriate, for the sake of easier understanding in some cases. Unless otherwise specified, the expression "extending in a specific direction" includes not only "extending parallel to a specific direction" but also "extending in a direction obtained by combining a specific direction and a direction perpendicular to the specific direction".

1. Embodiment

FIG. 1 is a view showing a measuring device 1. The measuring device 1 has a configuration suitable for measuring the electrical resistance of biological cells or tissues. Specifically, the measuring device 1 includes a relay section 2 and an electrode substrate 3. The relay section 2 is fixed to a robot arm 9 by a fixing method such as screwing. The robot arm 9 moves in three-dimensional space in accordance with the driving force of a motor (driving part) that operates under the control of a computer not shown. The electrode substrate 3 is attached to the relay section 2. In this embodiment, the electrode substrate 3 is removably attached to the relay section 2 by being inserted into an insertion port 231 of a housing 23 provided in the relay section 2.

In the following description, a longitudinal direction of the electrode substrate 3 which is parallel to a main surface (a first main surface 411 of a base section 41 to be described later) is referred to as a first direction D1, and a direction parallel to the main surface of the electrode substrate 3 and orthogonal to the first direction D1 is referred to as a second direction D2, based on a condition where the electrode substrate 3 is attached to the relay section 2, as shown in FIG. 1. Also, a direction orthogonal to both the first direction D1 and the second direction D2 (the thickness direction of the base section 41 in the electrode substrate 3) is referred to as a third direction D3 (with reference to FIG. 6).

Figure 2:
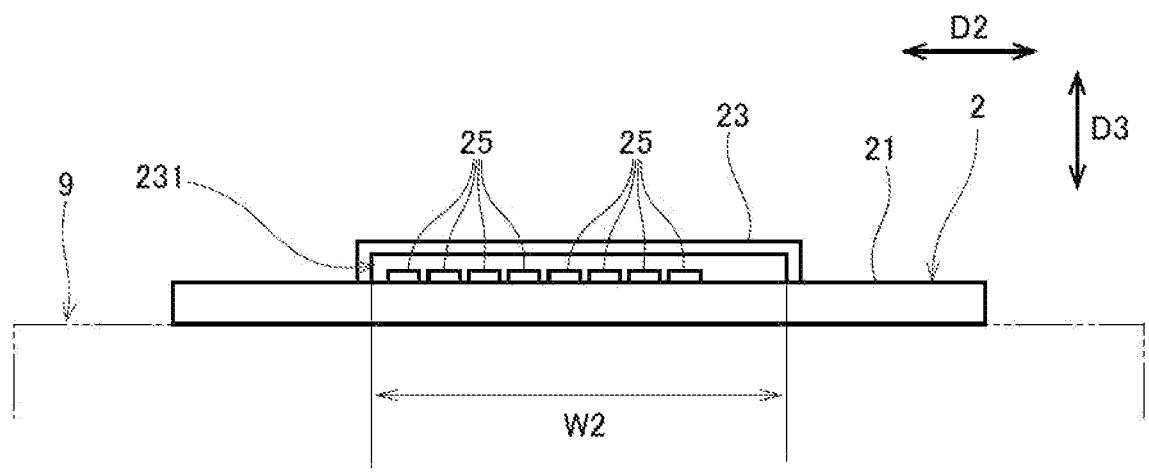
FIG. 2 is a view showing a relay section.

FIG. 2 is a view showing the relay section 2. The relay section 2 includes a relay board 21 and the housing 23. The relay board 21 is a flat plate member made of an insulative material such as epoxy resin or glass epoxy resin. The housing 23 is provided on an end portion of one main surface 211 of the relay board 21 on one side as seen in the first direction D1 and in the middle thereof as seen in the second direction D2. The housing 23 includes the insertion port 231 that opens toward the one side as seen in the first direction D1. The housing 23 has an interior (i.e., inside of the insertion port 231) sized to accommodate the base section 41 of the electrode substrate 3. Inside the housing 23, a plurality of (in this embodiment, eight) contact parts 25 are mounted in an array along the second direction D2. The contact parts 25 are connected to a cable 27. The cable 27 is connected to a device for measuring electrical resistance, such as a power supply 11 or a voltmeter 13 (with reference to FIG. 9).

The number and position of contact parts 25 inside the housing 23 coincide with the number (eight) and position of contact parts provided in an adapter in conformity with Micro SD standards, for example. In this case, a board for a card reader in conformity with the Micro SD standards can be used for the relay board 21. This reduces the production costs of the relay section 2.

Figure 3:
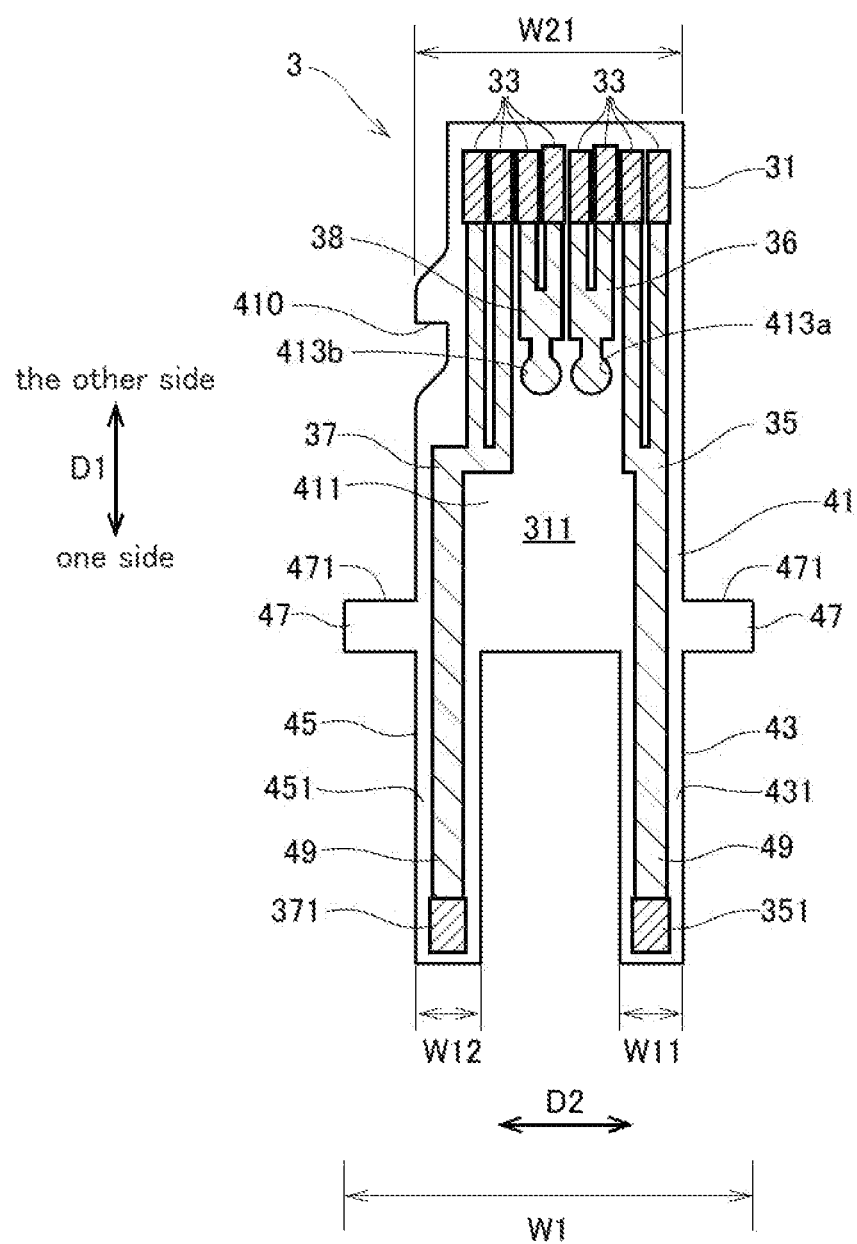
FIG. 3 is a plan view showing an electrode substrate.
Figure 4:
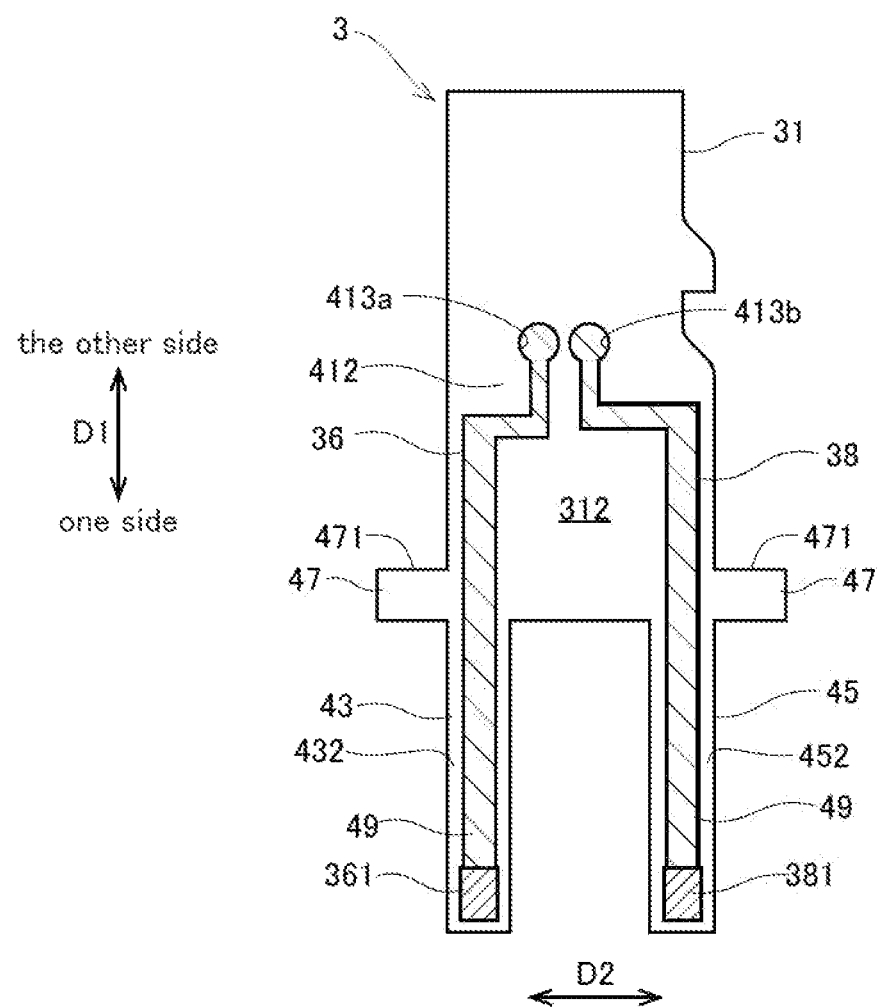
FIG. 4 is a plan view showing the electrode substrate.

FIG. 3 is a plan view showing the electrode substrate 3. FIG. 4 is a plan view showing the electrode substrate 3. FIG. 3 is a view showing a first main surface 311 side of a substrate 31, and FIG. 4 is a view showing a second main surface 312 side opposite the first main surface 311 of the substrate 31.

The electrode substrate 3 includes the substrate 31, a plurality of connection terminals 33, a first working electrode 35, a first reference electrode 36, a second working electrode 37, and a second reference electrode 38. The first working electrode 35, the first reference electrode 36, the second working electrode 37, and the second reference electrode 38 are generically referred to as "electrodes 35 to 38" in some cases in the following description.

The substrate 31 is a rigid, flat plate member made of an insulative material such as epoxy resin or glass epoxy resin. The substrate 31 includes the base section 41, a first extension part 43, a second extension part 45, and two protruding parts 47. The base section 41, the first extension part 43, the second extension part 45, and the two protruding parts 47 are formed integrally and have the same thickness. However, some or all of these parts may be members provided independently of other elements. As shown in FIG. 1, the first extension part 43, the second extension part 45, and the two protruding parts 47 are exposed to the outside of the housing 23, with the electrode substrate 3 attached to the relay section 2.

The substrate 31 has the first main surface 311 and the second main surface 312 on the side opposite the first main surface 311. The term "main surfaces" used herein refer to surfaces having the largest area. The first main surface 311 of the substrate 31 includes the first main surface 411 of the base section 41, a first main surface 431 (one main surface) of the first extension part 43, and a first main surface 451 of the second extension part 45. The second main surface 312 of the substrate 31 includes a second main surface 412 of the base section 41, a second main surface 432 (the other main surface) of the first extension part 43, and a second main surface 452 of the second extension part 45.

The outer shape of the base section 41 as seen in plan view is similar to that of a typical Micro SD card. For example, a locking part 410 having an uneven shape similar to that of a Micro SD card is provided on one side of the base section 41 as seen in the second direction D2. When the base section 41 of the electrode substrate 3 is inserted into the housing 23 of the relay section 2, an L-shaped plate spring 233 provided on one side in the housing 23 engages a recessed portion of the locking part 410 of the base section 41 (with reference to FIG. 1). This fixes the electrode substrate 3 in a fixed position relative to the relay section 2, with the electrodes of the electrode substrate 3 in contact with the respective contact parts 25 of the relay section 2. A spring mechanism or the like for urging the electrode substrate 3 toward one side of the first direction D1 may be provided inside the housing 23.

Two through holes 413a and 413b are formed in the middle part of the base section 41 as seen in the first direction D1 and the second direction D2. In this embodiment, the through holes 413a and 413b are positioned between a wiring part of the first working electrode 35 and a wiring part of the second working electrode 37. A wiring part of the first reference electrode 36 is provided in the through hole 413a, and a wiring part of the second reference electrode 38 is provided in the through hole 413b.

The first extension part 43 and the second extension part 45 are plate-like parts extending outwardly from different portions at a side edge of the base section 41. The term "side edge" used herein refers to a peripheral edge portion sandwiched between the outer peripheral portions of the first main surface 411 and the second main surface 412 of the base section 41. Base end portions of the respective extension parts 43 and 45 are connected to a side edge portion of the base section 41 on one side as seen in the first direction D1, and the extension parts 43 and 45 extend in the first direction D1. The extension parts 43 and 45 are spaced apart from each other in the second direction D2. The width W11 of the first extension part 43 as measured in the second direction D2 and the width W12 of the second extension part 45 as measured in the second direction D2 are less than the width W21 of the base section 41 as measured in the second direction D2. Although the shape and size of the first extension part 43 are the same as those of the second extension part 45 in this embodiment, the shape or size of the first extension part 43 may be different from that of the second extension part 45.

One protruding part 47 is provided on each side of the base section 41 in the second direction D2. The protruding parts 47 on both sides are provided in the same position with respect to the first direction D1. The protruding parts 47 are parts of the base section 41 which protrude in the second direction D2 from other parts (e.g., parts inserted in the housing 23). The width W1 (with reference to FIGS. 1 and 3) between the tips of the protruding parts 47 as measured in the second direction D2 is greater than the width W2 (with reference to FIGS. 1 and 2) of the insertion port 231 of the housing 23 as measured in the second direction D2. The width of the electrode substrate 3 is the largest in portions where the protruding parts 47 are provided on both sides. In other words, the width W1 is the largest width in the electrode substrate 3.

The protruding parts 47 provided on both sides of the base section 41 are used for the removal of the electrode substrate 3 attached to the relay section 2. Each of the protruding parts 47 has an engagement surface 471 facing toward the connection terminals 33 side (the other side of the first direction). The expression "the engagement surface faces toward the connection terminals" means that the direction of the normal to the engagement surface is parallel to a terminal side direction toward the connection terminals or is a direction having at least a component of the terminal side direction (i.e., a direction not perpendicular to the terminal side direction). The engagement surfaces 471 engage a lid part 53 (removal part) of a removal tool 5, so that the protruding parts 47 are urged toward the side opposite the connection terminals 33 (one side of the first direction D1). This urging force allows the electrode substrate to be removed from the relay section 2.

The plurality of (in this embodiment, eight) connection terminals 33 are provided on the first main surface 311 of the base section 41. Terminal parts of the electrodes 35 to 38 are connected to the connection terminals 33. In this embodiment, each of the electrodes 35 to 38 is connected to adjacent two of the connection terminals 33. For example, the first working electrode 35 is connected to adjacent two of the connection terminals 33, and has wiring parts meeting in an intermediate position in the base section 41. In other words, the first working electrode 35 branches from one wiring part into two wiring parts in the base section 41, and each of the two wiring parts is connected to one of the two adjacent connection terminals 33. In this case, if a conduction anomaly occurs in one of the two connection terminals 33 due to adhesion of foreign materials or the like but conduction is ensured in the other connection terminal 33, conduction between the first working electrode 35 and the relay section 2 is ensured. Similar effects are produced in each of the other electrodes 36, 37, and 38 by the connection to two of the connection terminals 33.

The electrodes 35 to 38 are wired on the surface of the substrate 31. The wiring for the electrodes 35 to 38 are provided on the surface of the substrate 31 by various methods such as etching and direct drawing, for example. In this example, the electrodes 35 to 38 are arranged in the order named along the second direction D2. However, the order of arrangement of the electrodes 35 to 38 is not limited to this but may be changed as appropriate.

The first working electrode 35 is wired from the base section 41 to the first extension part 43, and is provided on the first main surface 311 side of the substrate 31 (with reference to FIG. 3). Specifically, the first working electrode 35 is provided on the first main surface 411 of the base section 41 and on the first main surface 431 of the first extension part 43.

The first reference electrode 36 is wired from the base section 41 to the first extension part 43 (with reference to FIG. 4). Specifically, the wiring part extending from the two connection terminals 33 to the through hole 413a is provided on the first main surface 311 side of the substrate 31, and the wiring part beyond the through hole 413a is provided on the second main surface 312 side of the substrate 31. That is, the first reference electrode 36 is wired on the second main surface 432 of the first extension part 43.

The second working electrode 37 is wired from the base section 41 to the second extension part 45, and is provided on the first main surface 311 side of the substrate 31 (with reference to FIG. 3). Specifically, the second working electrode 37 is provided on the first main surface 411 of the base section 41 and on the first main surface 451 of the second extension part 45.

The second reference electrode 38 is wired from the base section 41 to the second extension part 45 (with reference to FIG. 4). Specifically, the wiring part extending from the two connection terminals 33 to the through hole 413b is provided on the first main surface 311 side of the substrate 31, and the wiring part beyond the through hole 413b is provided on the second main surface 312 side of the substrate 31. That is, the second reference electrode 38 is wired on the second main surface 452 of the second extension part 45.

The wiring parts of the electrodes 35 to 38 are covered with a resist 49 that is an insulator, and terminal parts 351, 361, 371, and 381 provided in the first extension part 43 and the second extension part 45 are exposed to the outside. The terminal parts 351, 361, 371, and 381 are parts to be immersed in the culture solution during the measurement of the electrical resistance. The tip of the first extension part 43 and the tip of the second extension part 45 are spaced apart in the second direction D2. For this reason, the terminal part 351 of the first working electrode 35 and the terminal part 371 of the second working electrode 37 are disposed in positions separated in the second direction D2 (with reference to FIG. 3). Also, the terminal parts 361 and 381 of the reference electrodes 36 and 38 are disposed in positions separated in the second direction D2 (with reference to FIG. 4).

In the electrode substrate 3, the two electrodes 35 and 36 are provided on the common first extension part 43, whereby the electrode substrate 3 is reduced in size. Similarly, the two electrodes 37 and 38 are provided on the common second extension part 45, whereby the electrode substrate 3 is reduced in size. In addition, the electrodes 35 and 36 are provided respectively on the main surfaces 431 and 432 on both sides of the first extension part 43, whereby the region of the main surfaces 431 and 432 is effectively used. This allows the electrodes 35 and 36, for example, to be wider, thereby reducing the occurrence of conduction failures due to a break in the conductors. The same is true for the main surfaces 451 and 452 on both sides of the second extension part 45.

Configuration for Removal of Electrode Substrate 3 From Relay Section 2

Figure 5:
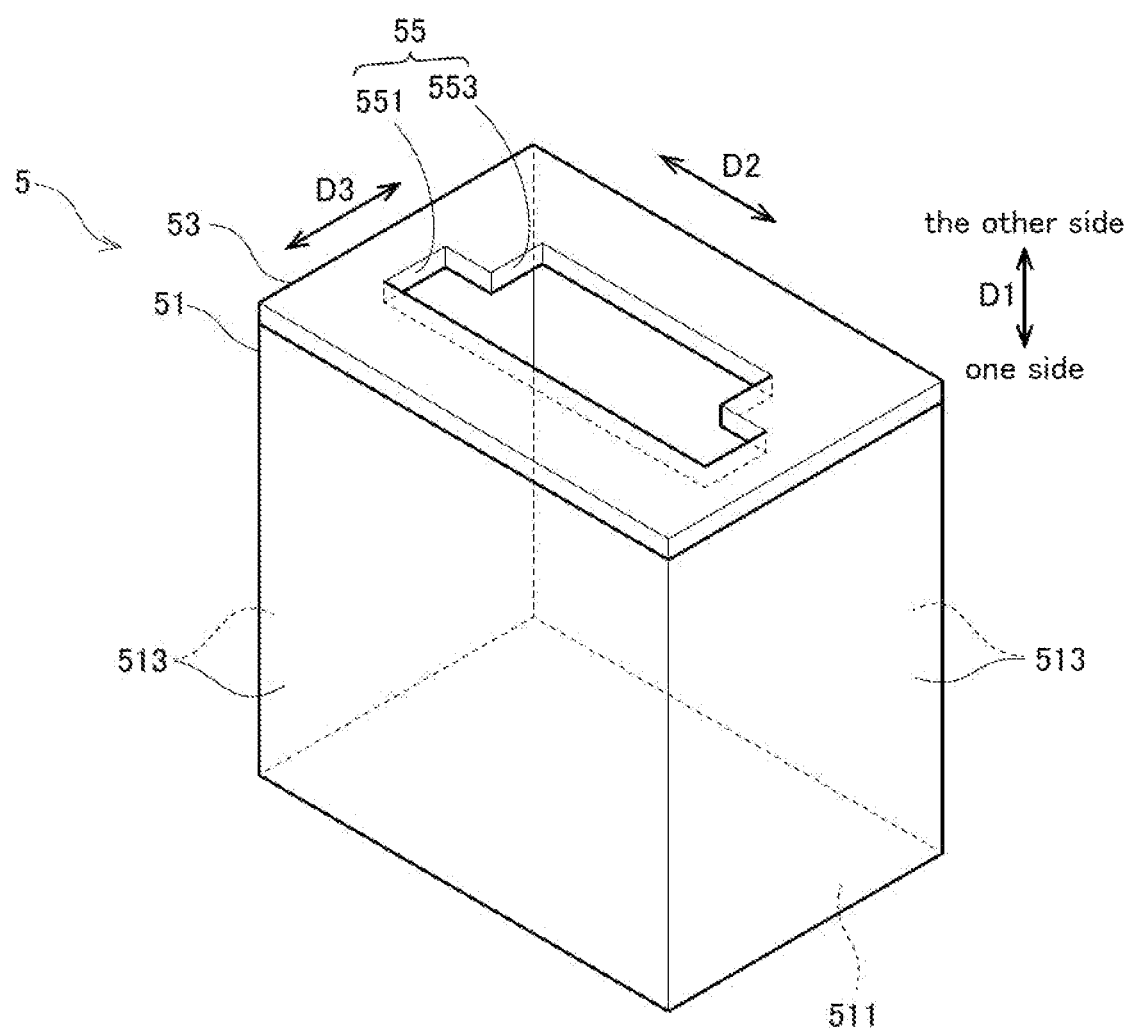
FIG. 5 is a perspective view showing a removal tool.
Figure 6:
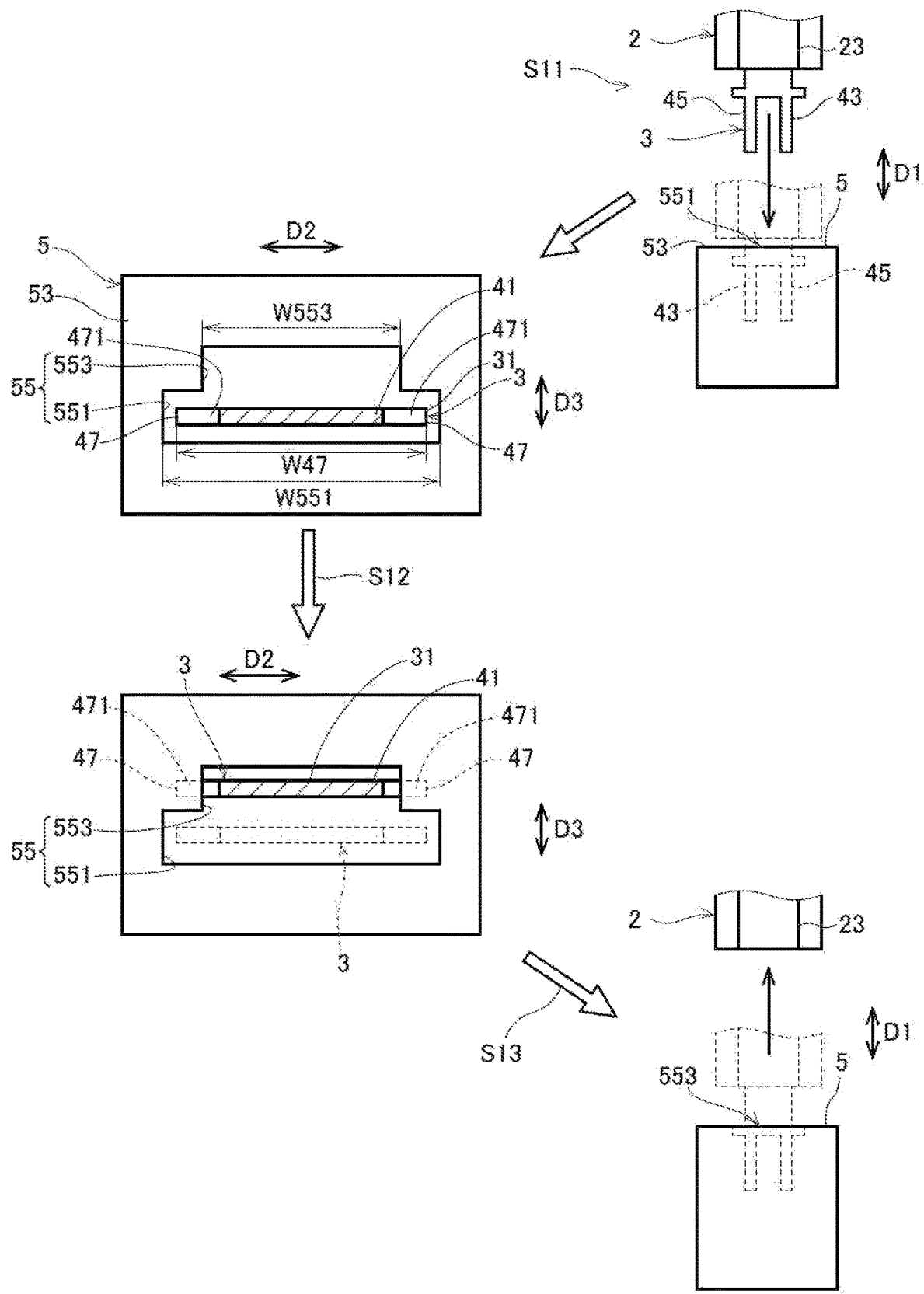
FIG. 6 is a view illustrating an example of the use of the removal tool.

FIG. 5 is a perspective view showing the removal tool 5.
FIG. 6 is a view illustrating an example of the use of the removal tool 5. In FIG. 6, top and side views of the removal tool 5 are shown, and the robot arm 9 or the relay section 2 is not shown as appropriate. The removal tool 5 is a member used to remove the electrode substrate 3 attached to the relay section 2. The removal tool 5 together with the measuring device 1 constitutes a measuring system. The removal tool 5 has the shape of a hollow rectangular parallelepiped, and specifically includes a recovery container 51 and the lid part 53 (removal part). The recovery container 51 is a member having a tubular shape with a bottom, and includes a horizontal base plate part 511 having a rectangular shape and four side panel parts 513 provided vertically upright on the four sides that are peripheral edges of the base plate part 511 and coupled to each other. The lid part 53 is provided on top of the four side panel parts 513, and has the shape of a rectangular plate. The lid part 53 has an opening part 55 provided in the center thereof. The opening part 55 forms a through hole extending vertically through the lid part 53.

The opening part 55 includes a first opening 551 and a second opening 553. The first opening 551 is greater than part of the electrode substrate 3 where the protruding parts 47 (engagement parts) are formed on both sides. In this embodiment, the opening width W551 of the first opening 551 (width as measured in the second direction D2) is greater than the width W47 from an end portion of one of the protruding parts 47 to an end portion of the other protruding part 47 in the electrode substrate 3 (with reference to FIG. 6). This allows not only the first extension part 43 and the second extension part 45 but also the protruding parts 47 on both sides in the electrode substrate 3 to pass through the first opening 551.

The second opening 553 is provided so as to be continuous with the first opening 551, and is smaller than part of the electrode substrate 3 where the protruding parts 47 are formed on both sides. In this embodiment, the second opening 553 is provided on one side of the first opening 551 as seen in the third direction D3. The opening width W553 of the second opening 553 (width as measured in the second direction D2) is less than the opening width W551 of the first opening 551, less than the width W47 of the electrode substrate 3, and greater than the width W21 (with reference to FIG. 3) of the base section 41 (with reference to FIG. 6). This precludes the protruding parts 47 on both sides from passing through the second opening 553.

With reference to FIG. 6, a procedure for the removal of the electrode substrate 3 from the relay section 2 by means of the removal tool 5 will be described. The removal tool 5 is fixed, for example, in a predetermined position in an attitude such that the side panel parts 513 are parallel to a vertical direction and the base plate part 511 and the lid part 53 are horizontal. The robot arm 9 moves the relay section 2 with the electrode substrate 3 attached thereto to a position where the removal tool 5 is provided. Then, as shown in FIG. 6, the robot arm 9 moves to one side of the first direction D1 (a direction toward the lid part 53), so that part of the electrode substrate 3 which is exposed from the housing 23 of the relay section 2 is inserted into the first opening 551 of the removal tool 5 (insertion step S11). In this insertion step S11, all of the protruding parts 47 on both sides of the electrode substrate 3 together with the extension parts 43 and 45 are inserted through the inside of the first opening 551 into the back side of the lid part 53 (inside of the recovery container 51).

After the insertion step S11, the robot arm 9 moves in the third direction D3. This moves the electrode substrate 3 from the inside of the first opening 551 to the inside of the second opening 553 (movement step S12). This movement step S12 causes the protruding parts 47 on both sides of the electrode substrate 3 to be placed under the second opening 553. Thus, the protruding parts 47 on both sides overlap the second opening 553 in the first direction D1. In other words, tip portions of the engagement surfaces 471 of the protruding parts 47 as seen in the second direction D2 are opposed to the second opening 553.

After the movement step S12, the robot arm 9 moves to the other side of the first direction D1 (a direction away from the lid part 53). This withdraws the electrode substrate 3 from the second opening 553 (withdrawal step S13). In this withdrawal step S13, the electrode substrate 3 and the engagement surfaces 471 of the protruding parts 47 on both sides are caught in (engage) the second opening 553, so that the protruding parts 47 on both sides are urged toward the side opposite the relay section 2. As a result, the electrode substrate 3 is removed from the relay section 2. In other words, the electrode substrate 3 is extracted from the housing 23 of the relay section 2 and collected in the recovery container 51. In this manner, the use of the removal tool 5 for the removal of the electrode substrate 3 facilitates the removal of the electrode substrate 3 to be replaced and facilitates the collection of the removed electrode substrate 3. Thus, for example, even in the case of measurement of multiple samples or measurement of the same sample for a long time, the need for the process of cleaning the electrodes is eliminated by attaching, detaching, and replacing a plurality of electrode substrates 3 according to the circumstances, so that the measurement is made with high efficiency and with high accuracy. Also, application to a robot system including the robot arm 9 achieves the measurement with higher efficiency and with higher accuracy. In particular, the present measuring system is extremely advantageous in application to the robot system because the electrode substrate 3 is attached to and detached from the relay section 2 by a relatively simple linear movement.

The removal tool 5 is used in an attitude such that the opening part 55 of the lid part 53 opens vertically upwardly. However, the removal tool 5 may be used in a horizontally lying attitude. In this case, the opening part 55 of the lid part 53 opens in a horizontal direction. Thus, the robot arm 9 moves in a horizontal direction and in a vertical direction as appropriate, whereby the electrode substrate 3 is removed from the relay section 2.

Measurement of Electrical Resistance

Figure 7:
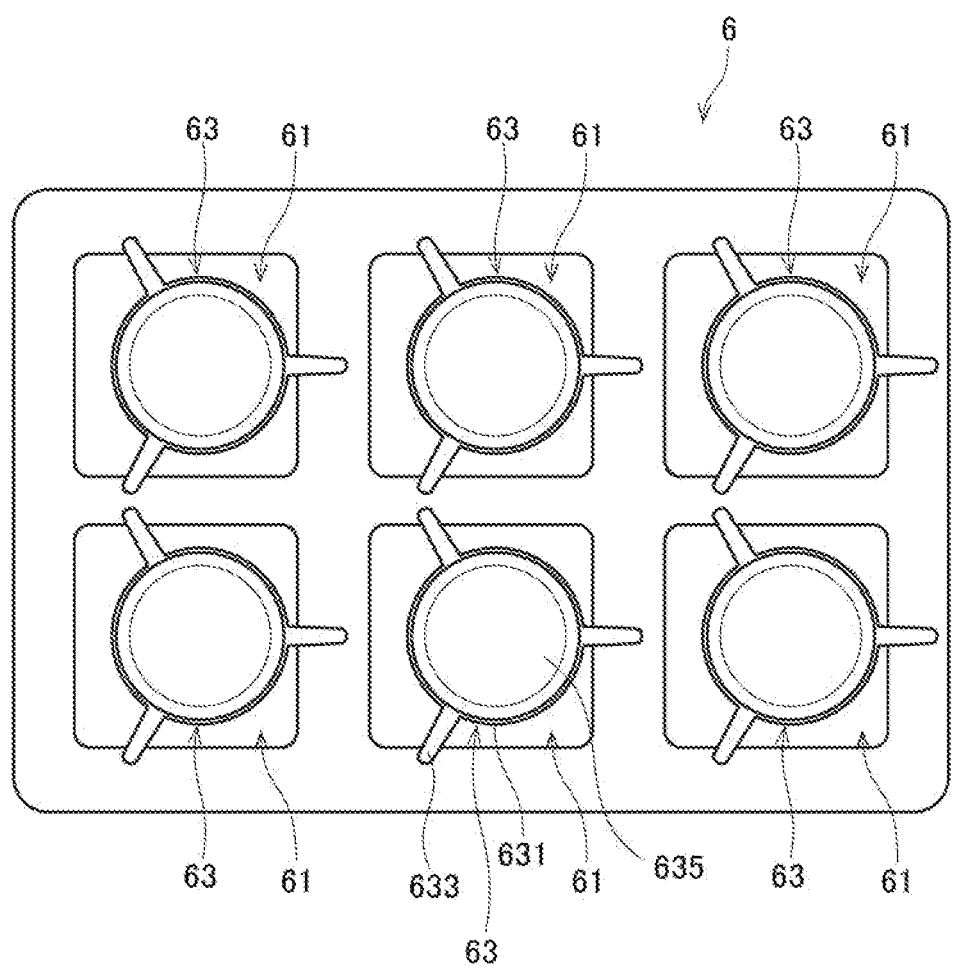
FIG. 7 is a top view showing a culture vessel to which the measuring device is applied.
Figure 8:
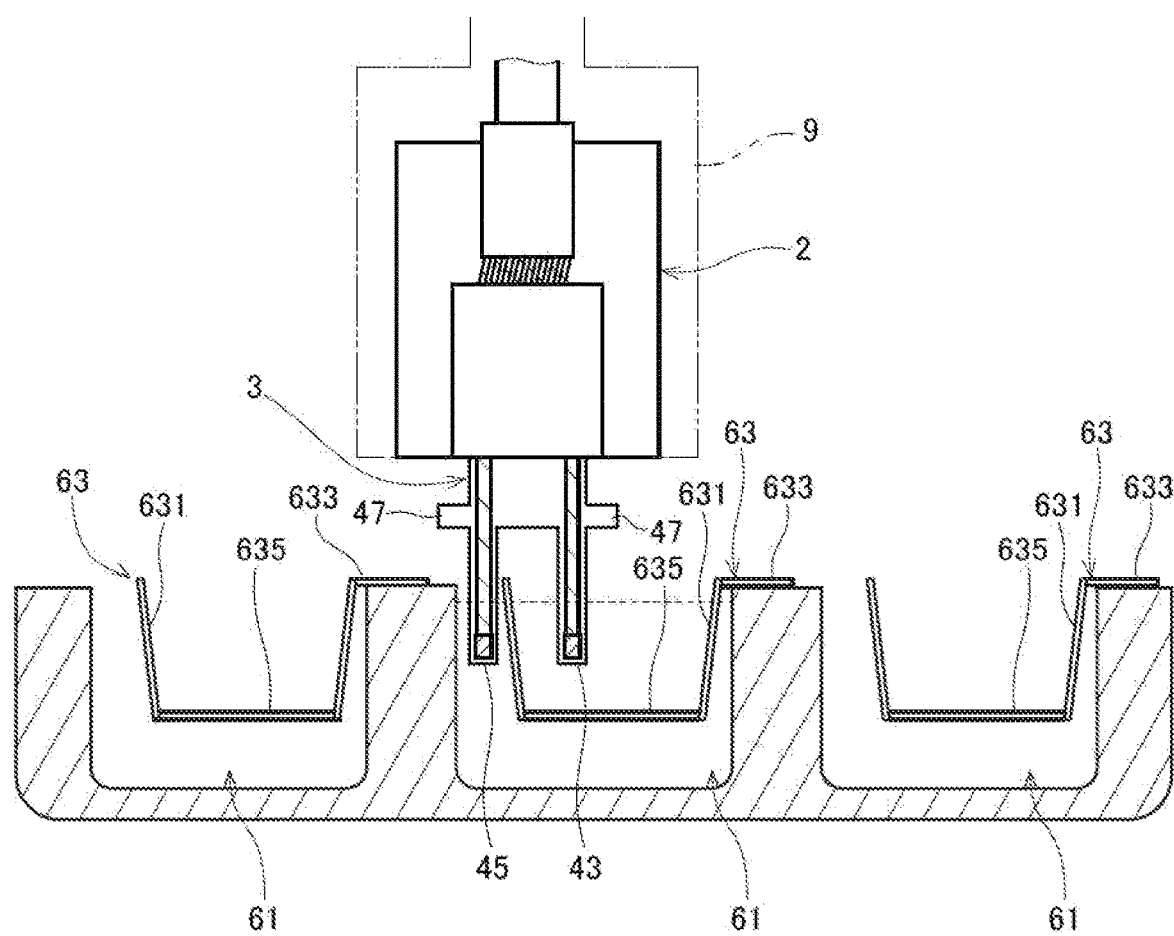
FIG. 8 is a sectional view of the measuring device applied to the culture vessel.
Figure 9:
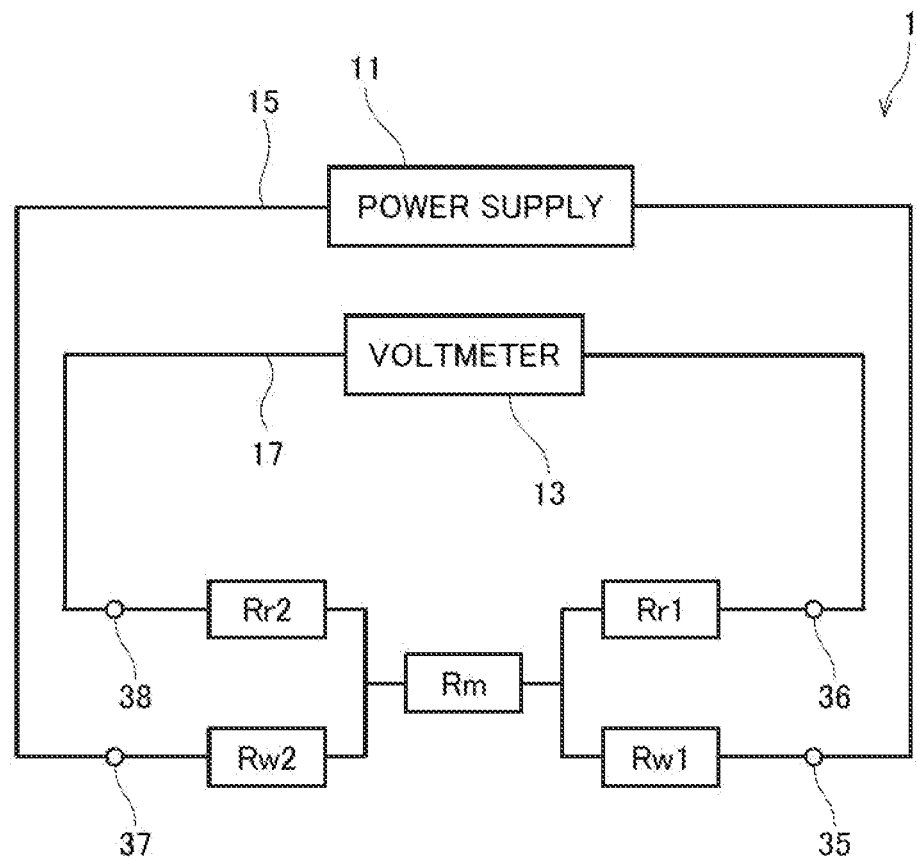
FIG. 9 is a schematic diagram showing electrical connections of the measuring device.

FIG. 7 is a top view showing a culture vessel 6 to which the measuring device 1 is applied. FIG. 8 is a sectional view of the measuring device 1 applied to the culture vessel 6. FIG. 9 is a schematic diagram showing electrical connections of the measuring device 1.

The culture vessel 6 is a vessel for cultivating cells which are objects whose electrical resistance is to be measured with the electrodes 35 to 38 provided on the electrode substrate 3. The culture vessel 6 is what is called a well plate having a plurality of wells 61. As shown in FIGS. 7 and 8, each of the wells 61 is formed in a tubular shape with a bottom. In the culture vessel 6, a total of six wells 61 are arranged in a matrix with two rows arranged in a vertical direction and three columns arranged in a horizontal direction. The culture vessel 6 is not limited to that having six wells 61, but may have, for example, 12, 24, 96, or 384 wells.

An insert cup 63 is placed inside each of the wells 61 of the culture vessel 6. The insert cup 63 includes a cylindrical part 631, support parts 633, and a cell culture part 635. The cylindrical part 631 is made of an insulative material, and is formed in a frusto-conical (tapering toward the cell culture part 635) and tubular shape.

The support parts 633 are parts extending outwardly from an upper end of the cylindrical part 631. When the support parts 633 are placed on an upper surface of the culture vessel 6, the cylindrical part 631 and the cell culture part 635 are placed in a position inside each of the wells 61 where the cell culture part 635 is not in contact with a bottom surface of each of the wells 61. In this embodiment, the support parts 633 are disposed radially in three locations circumferentially of the one cylindrical part 631. It should be noted that the support parts 633 may be of any configuration capable of supporting the cylindrical part 631 and the cell culture part 635 in a predetermined position. For example, the support parts 633 may be disposed only in two locations circumferentially of the insert cup 63 or in four or more locations. In place of the support parts 633, a support part 633 may be provided in the shape of a flange extending outwardly from a circumferential portion of the insert cup 63.

The cell culture part 635 is a membrane covering a lower opening of the cylindrical part 631. A membrane having cell adhesive properties is preferably used for the cell culture part 635. A plate-like member provided with a large number of minute through holes is preferably used for the cell culture part 635. During the cultivation of cells to be measured, a culture solution is poured into each of the wells 61 at least to a level where the cell culture part 635 is immersed therein.

When the measuring device 1 is applied to such a culture vessel 6, the extension parts 43 and 45 of the electrode substrate 3 attached to the relay section 2 are placed over one of the wells 61 in the culture vessel 6, for example, by moving the robot arm 9 in a horizontal direction.

Subsequently, the tips of the extension parts 43 and 45 of the electrode substrate 3 are placed inside the one well 61 by moving the robot arm 9 vertically downwardly (with reference to FIG. 8). Specifically, the first extension part 43 is placed inside the insert cup 63, and the second extension part 45 is placed inside the well 61 and outside the insert cup 63. Then, the tips of the extension parts 43 and 45 are immersed in the culture solution stored in the well 61 and in the insert cup 63. Specifically, the terminal parts 351, 361, 371, and 381 of the electrodes 35 to 38 provided on the main surfaces of the extension parts 43 and 45 are placed below the level (indicated by a broken line in FIG. 8) of the culture solution. Thus, the terminal parts 351, 361, 371, and 381 are immersed in the culture solution.

As shown in FIG. 9, the measuring device 1 includes the power supply 11 and the voltmeter 13. The power supply 11 has an output terminal connected through a conducting wire 15 to the first working electrode 35 and the second working electrode 37. The voltmeter 13 has an input terminal connected through a conducting wire 17 to the first reference electrode 36 and the second reference electrode 38.

In FIG. 9, a resistance Rm corresponds to the electrical resistance of the cell culture part 635 and the cells cultivated on the cell culture part 635 (which are collectively referred to hereinafter as a "cellular part"). A resistance Rw1 is the electrical resistance of the culture solution between the first working electrode 35 and the cellular part. A resistance Rw2 is the electrical resistance of the culture solution between the second working electrode 37 and the cellular part. A resistance Rr1 is the electrical resistance of the culture solution between the first reference electrode 36 and the cellular part. A resistance Rr2 is the electrical resistance of the culture solution between the second reference electrode 38 and the cellular part. The resistance values of the resistances Rw1, Rr1, Rw2, and Rr2 between the respective electrodes 35 to 38 and the cellular part and the resistance Rm of the cell culture part 635 with no cells cultivated are measured previously as control experiments.

For measurement of the electrical resistance of cells, the power supply 11 is driven to apply an electric potential between the first working electrode 35 and the second working electrode 37, and the voltmeter 13 measures a voltage value between the first reference electrode 36 and the second reference electrode 38 at the same time. Then, the exact voltage value between the working electrodes 35 and 37 is calculated from the measured voltage value by a computer not shown or by manual calculation, and the electrical resistance between the working electrodes 35 and 37 is calculated from the voltage value. Further, the resistance Rm of the cellular part is calculated from the electrical resistance between the working electrodes 35 and 37 by the computer not shown or by the manual calculation. Thus, the electrical properties of the cells cultivated on the cell culture part 635 are obtained.

When the power supply 11 is used to apply an electric potential between the working electrodes 35 and 37, oxidation and reduction reactions of the culture solution occur on the surfaces of the working electrodes 35 and 37, which in turn results in the formation of an electric double layer in some cases. In this case, there is apprehension that an output potential by the power supply 11 and a voltage value between the working electrodes 35 and 37 differ from each other. To avoid this, the reference electrodes 36 and 38 are disposed in the vicinity of the working electrodes 35 and 37, respectively, and an electric potential between the reference electrodes 36 and 38 is measured. The resistance Rm of the cellular part is measured more accurately by calculation using the measured electric potential.

In particular, the terminal part 351 of the first working electrode 35 is provided on the first main surface 431 of the first extension part 43, and the terminal part 361 of the first reference electrode 36 is provided on the second main surface 432 thereof in the present embodiment. This allows the terminal parts 351 and 361 of the electrodes 35 and 36 to be in close proximity to each other. Similarly, the terminal part 371 of the second working electrode 37 provided on the second extension part 45 and the terminal part 381 of the second reference electrode 38 provided thereon are allowed to be in close proximity to each other. Thus, the resistance Rm of the cellular part is measured accurately. The first extension part 43 present between the electrodes 35 and 36 provides electrical insulation between the electrodes 35 and 36. Similarly, the second extension part 45 present between the electrodes 37 and 38 provides electrical insulation between the electrodes 37 and 38.

As shown in FIG. 8, the two extension parts 43 and 45 have the same length in the first direction D1 in the electrode substrate 3. However, the second extension part 45 may be made longer than the first extension part 43, for example. In this case, the tip of the second extension part 45 is brought closer to the bottom surface of the well 61 while the tip of the first extension part 43 is restrained from interfering with the cell culture part 635. This allows the terminal parts 371 and 381 of the electrodes 37 and 38 wired in the second extension part 45 to be disposed in a position close to the bottom surface of the well 61 (e.g., in a position below the cell culture part 635).

Also, multiple sets of relay sections 2 and electrode substrates 3 may be provided for one set of power supply 11 and voltmeter 13. In other words, multiple sets of electrodes 35 to 38 may be connected to one power supply 11 or one voltmeter 13.

Configuration for Attaching Electrode Substrate 3 to Relay Section 2

Figure 10:
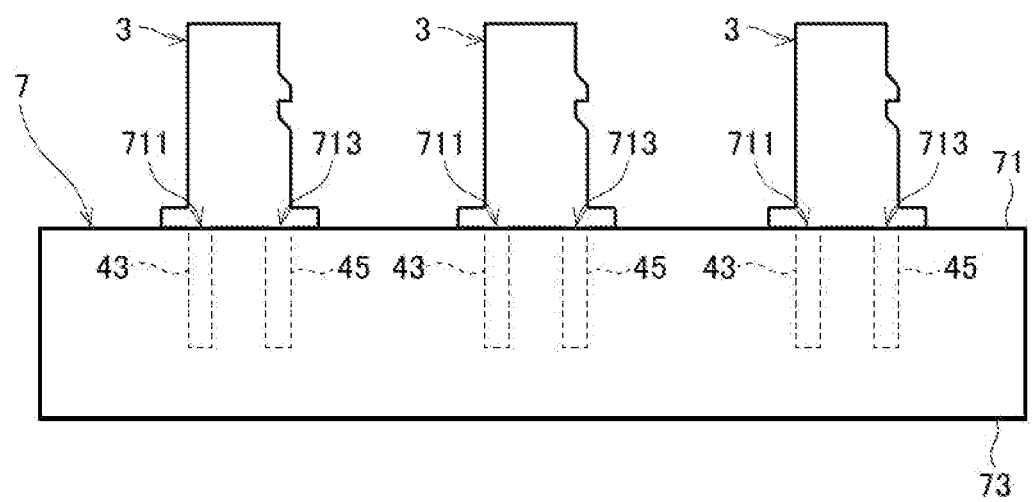
FIG. 10 is a schematic side view showing a substrate holder which holds a plurality of electrode substrates.
Figure 11:
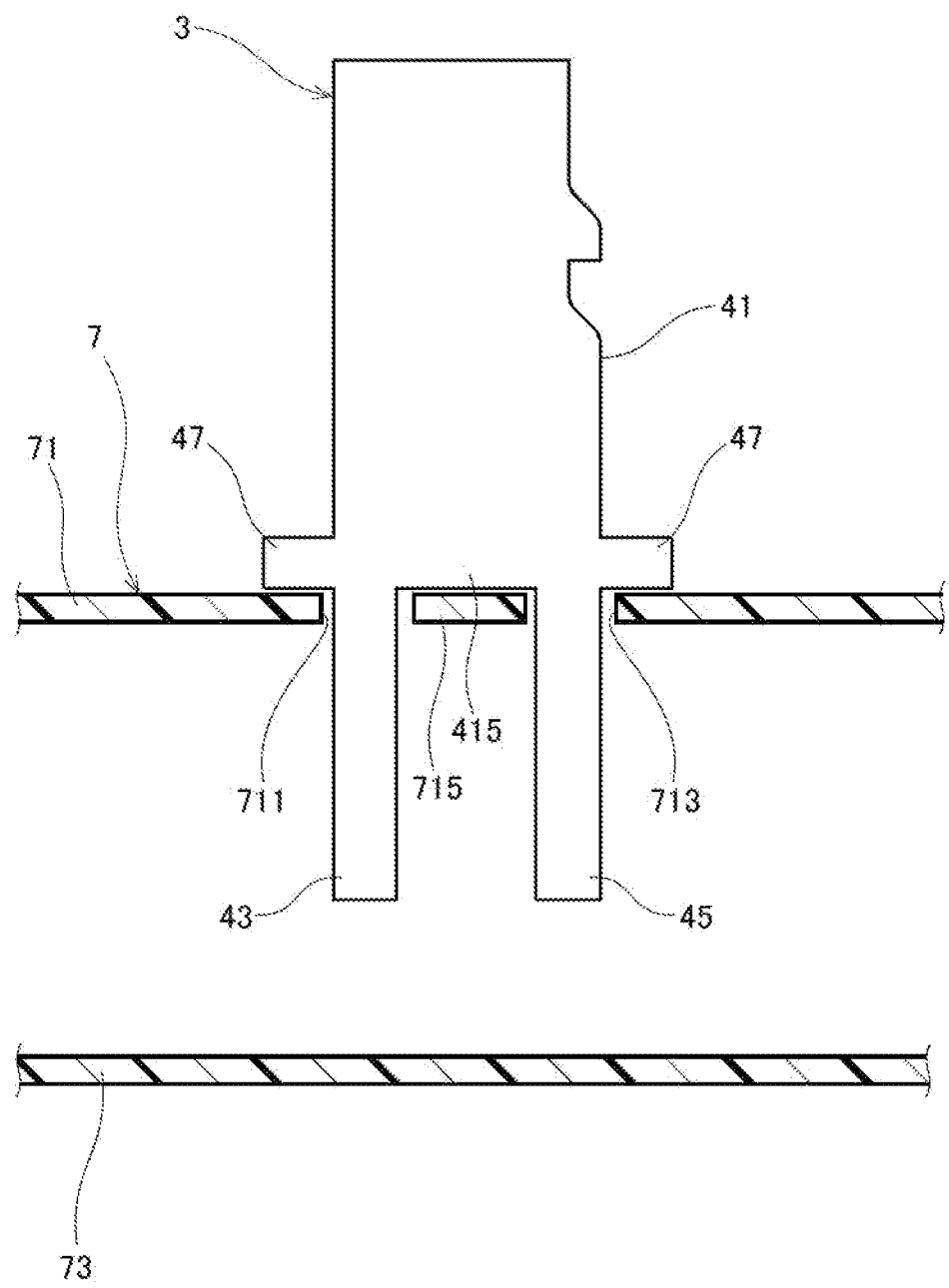
FIG. 11 is a schematic sectional view showing the substrate holder which supports an electrode substrate.

FIG. 10 is a schematic side view showing a substrate holder 7 which holds a plurality of electrode substrates 3. FIG. 11 is a schematic side view of the substrate holder 7 which supports an electrode substrate 3. The substrate holder 7 holds the plurality of electrode substrates 3 arranged in a row or in multiple rows and in regularly spaced apart relation in the row direction.

The substrate holder 7 is formed in the shape of a hollow box, and includes a plate-like ceiling part 71 disposed on a vertically upper side, and a plate-like bottom part 73 disposed on a vertically lower side. Multiple sets of through holes 711 and 713 arranged in predetermined spaced apart relation in one direction are formed in the ceiling part 71. The first extension part 43 is inserted into each of the through holes 711, and the second extension part 45 is inserted into each of the through holes 713. A distance between the ceiling part 71 and the bottom part 73 is greater than the length of the extension parts 43 and 45 as measured in the first direction D1.

The substrate holder 7 holds the electrode substrates 3, with the extension parts 43 and 45 of the electrode substrates 3 inserted in the through holes 711 and 713. In this state, the protruding parts 47 on both sides of the electrode substrate 3 are supported by the ceiling part 71, as shown in FIG. 11. Also, a middle part 415 between the extension parts 43 and 45 in the base section 41 is supported by an upper surface of a middle support part 715 between the through holes 711 and 713 in the ceiling part 71. In this manner, the substrate holder 7 holds the electrode substrates 3, with the extension parts 43 and 45 disposed on a vertically lower side and the connection terminals 33 disposed on a vertically upper side.

For attaching the electrode substrate 3 to the relay section 2, the robot arm 9 causes the relay section 2 to approach one of the electrode substrates 3 held by the substrate holder 7 from immediately over the one electrode substrate 3. Then, by moving the robot arm 9 vertically downwardly, the electrode substrate 3 enters the insertion port 231 of the housing 23, and the electrode substrate 3 is thus fixed to the housing 23. Once the electrode substrate 3 is attached to the relay section 2, the robot arm 9 moves vertically upwardly to withdraw the electrode substrate 3 from the substrate holder 7.

In this manner, the substrate holder 7 holds the plurality of electrode substrates 3, whereby each of the electrode substrates 3 is easily attached to the relay section 2. Also, the combined use of the removal tool 5 and the substrate holder 7 facilitates the attachment, removal, and replacement of the electrode substrates 3.

In the ceiling part 71, the through holes 711 and 713 may be coupled to each other to form a single through hole, for example. In this case, the ceiling part 71 does not support the middle part 415 but supports lower edges of the protruding parts 47 on both sides to support each of the electrode substrates 3 because the middle support part 715 is omitted. Alternatively, the ceiling part 71 may be configured to support only the middle part 415 of each of the electrode substrates 3 without supporting the protruding parts 47 on both sides. In this case, the ceiling part 71 may be formed by only one or more middle support parts 715.

2. Modifications

While the embodiment according to the present invention has been described hereinabove, the present invention is not limited to the aforementioned embodiment, but various modifications may be made. In the following description, components having the same functions as those described above are designated by like reference numerals and characters or like reference numerals and characters with alphabetic characters appended thereto, and will not be described in detail in some cases.

2-1. First Modification

Figure 12:
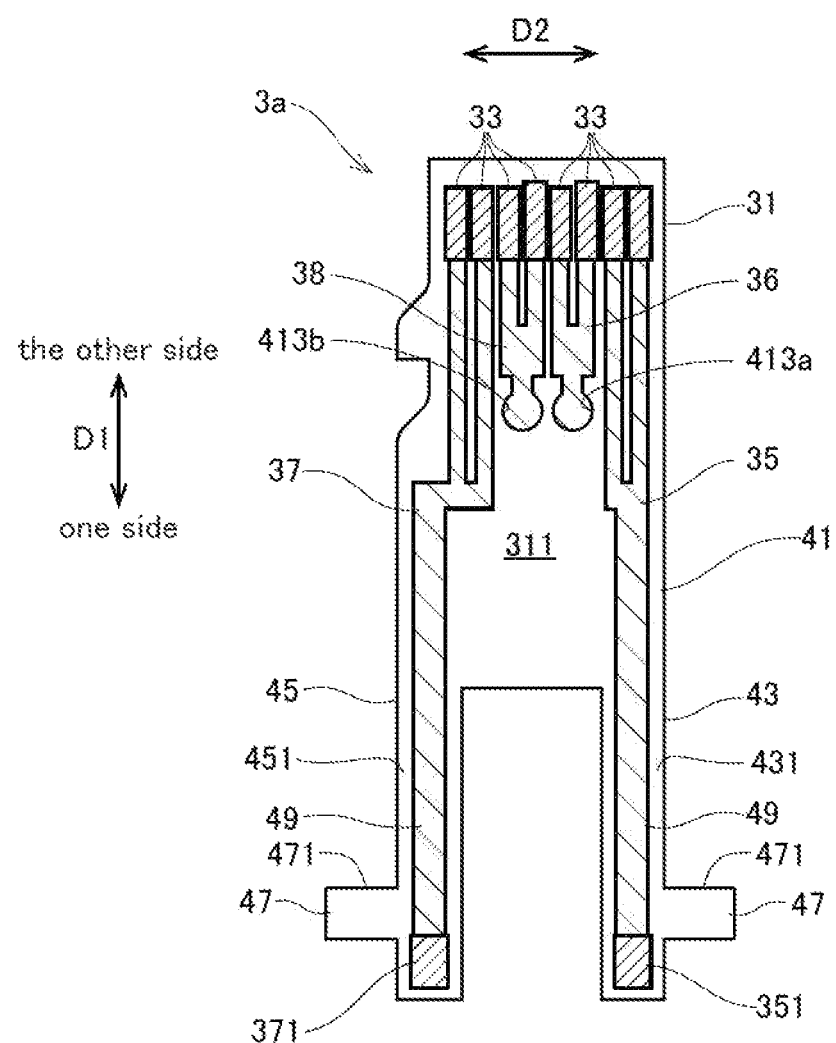
FIG. 12 is a front view showing an electrode substrate according to a first modification.

FIG. 12 is a front view showing an electrode substrate 3a according to a first modification. The protruding parts 47 on both sides in the electrode substrate 3a are provided on side portions of the first and second extension parts 43 and 45, whereas the protruding parts 47 on both sides in the electrode substrate 3 of the aforementioned embodiment are provided on the base section 41. The removal tool 5 or other removal members may engage the protruding parts 47 on both sides of the electrode substrate 3a, whereby the electrode substrate 3a is removed from the measuring device 1. Thus, the use of the electrode substrate 3a produces effects similar to those obtained when the electrode substrate 3 is used.

2-2. Second Modification

Figure 13:
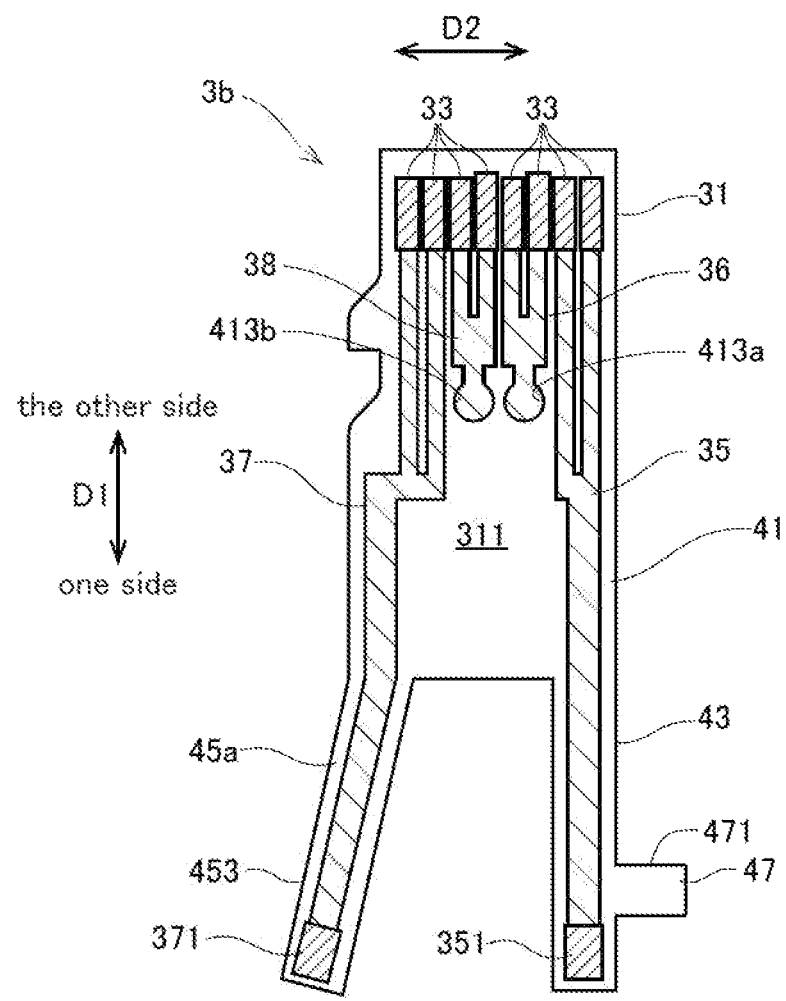
FIG. 13 is a front view showing an electrode substrate according to a second modification.

FIG. 13 is a front view showing an electrode substrate 3b according to a second modification. The electrode substrate 3b includes a second extension part 45a extending from a side edge of the base section 41. The second extension part 45a from its base end portion to its tip extends in a direction away from the first extension part 43. Accordingly, a distance between the outsides of the first extension part 43 and the second extension part 45a gradually increases toward one side of the first direction D1. Like the second extension part 45, the second extension part 45a is provided with the second working electrode 37 and the second reference electrode 38. Like the first extension part 43 of the electrode substrate 3, the first extension part 43 of the electrode substrate 3b is provided with a protruding part 47.

Like the electrode substrate 3, the electrode substrate 3b is easily attached to and removed from the housing 23 of the relay section 2. For the removal of the electrode substrate 3b from the relay section 2 by means of the removal tool 5 shown in FIG. 5, for example, the extension parts 43 and 45a are initially inserted through the inside of the first opening 551 of the opening part 55, and are then moved toward the second opening 553 side. Then, the electrode substrate 3b is moved upwardly, whereby the protruding part 47 provided on the first extension part 43 and an outer surface 453 (a surface on the side opposite the first extension part 43) of the second extension part 45a engage the lower surface of the second opening 553. That is, the outer surface 453 of the second extension part 45a functions as an engagement surface in this modification to achieve the removal of the electrode substrate 3b from the relay section 2. In other words, the outer surface 453 functions as the engagement surface or the engagement part. Thus, the use of the electrode substrate 3b produces effects similar to those obtained when the electrode substrate 3 is used.

Also, the first extension part 43 may extend in a direction away from the second extension part 45a toward one side of the first direction D1. In this case, the protruding part 47 may be dispensed with if the outer surface of the first extension part 43 is capable of functioning as the engagement surface.

2-3. Third Modification

Figure 14:
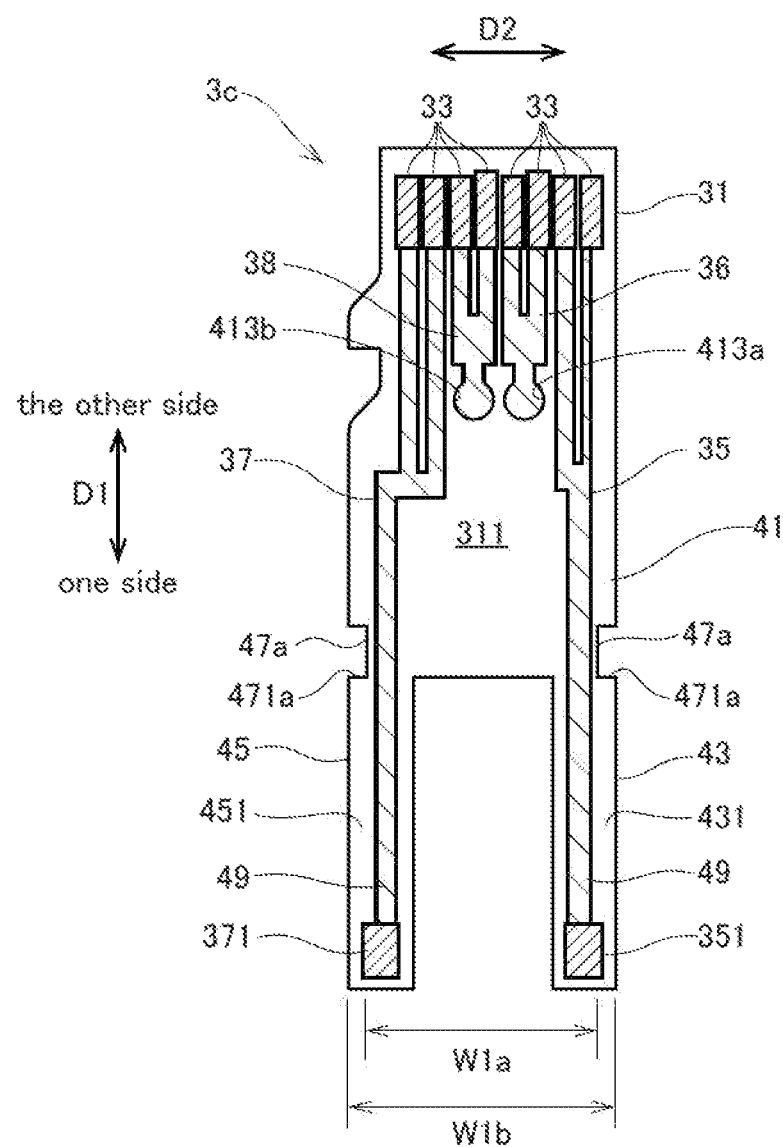
FIG. 14 is a front view showing an electrode substrate according to a third modification.

FIG. 14 is a front view showing an electrode substrate 3c according to a third modification. In the electrode substrate 3 of the aforementioned embodiment, the protruding parts 47 are provided on both sides of the base section 41. In the electrode substrate 3c, on the other hand, recessed parts 47a are provided one in each side edge on each side of the base section 41 as seen in the second direction D2. The recessed parts 47a on both sides are provided in the same position with respect to the first direction D1. The width W1a between the innermost portions of the recessed parts 47a on both sides is less than the width W1b of the base section 41.

The direction of the normal to a surface 471a on one side of the first direction D1 from the most recessed portion in the second direction D2 among the inner surfaces of each of the recessed parts 47a has a component of a direction toward the connection terminals 33 side (the other side of the first direction D1). During the removal of the electrode substrate 3c from the relay section 2, the surface 471a in each of the recessed parts 47a functions as an engagement surface.

When the removal tool 5 as shown in FIG. 5 is applied to the removal of the electrode substrate 3c from the relay section 2, the opening width W553 of the second opening 553 of the opening part 55 in the removal tool 5 is required only to be greater than the width W1a and less than the width W1b. This allows the second opening 553 to enter the inside of the recessed parts 47a on both sides. The surfaces 471a of the recessed parts 47a on both sides engage the second opening 553 by withdrawing the electrode substrate 3c from the second opening 553, with the second opening 553 entering the inside. This facilitates the removal of the electrode substrate 3c attached to the relay section 2 from the relay section 2. Although provided in the base section 41 in this modification, the recessed parts 47a may be provided in the extension parts 43 and 45.

2-4. Other Modifications

In the aforementioned embodiment, the two electrodes 35 and 36 are provided on the common first extension part. However, a third extension part extending from the base section 41 may be provided in the vicinity of the first extension part 43, so that one of the electrodes 35 and 36 is provided on the first extension part 43 and the other is provided on the third extension part. Similarly, a fourth extension part extending from the base section 41 may be provided in the vicinity of the second extension part 45, so that one of the electrodes 37 and 38 is provided on the second extension part 45 and the other is provided on the fourth extension part.

Although provided on the second main surface 432 of the first extension part 43 in the aforementioned embodiment, the terminal part 361 of the first reference electrode 36 may be provided on the first main surface 431 of the first extension part 43. Similarly, the terminal part 381 of the second reference electrode 38 may be provided on the first main surface 451 of the second extension part 45. Although provided on the first main surface 431 of the first extension part 43 in the aforementioned embodiment, the terminal part 351 of the first working electrode 35 may be provided on the second main surface 432 of the first extension part 43. In this case, a through hole may be provided in the base section 41 in the same manner as the through hole 413a, so that the first working electrode 35 is wired through the through hole on the second main surface 312 of the substrate 31. Similarly, the terminal part 371 of the second working electrode 37 may be provided on the second main surface 452 of the second extension part 45.

Although each of the extension parts 43 and 45 is shaped to extend in a straight line in the aforementioned embodiment, the extension parts may have a bent or curved shape. The electrodes 35 to 38 may be bent or curved in accordance with the bent or curved shape of the extension parts. The extension parts 43 and 45 are shaped to extend outwardly from one side edge portion of the base section 41 as seen in the first direction D1. However, the extension parts may be shaped to extend outwardly from any one of the side edge portions of the base section 41 as seen in the second direction D2. Also, the extension parts 43 and 45 may extend in the third direction D3.

Although provided in conformity with the Micro SD standards in the aforementioned embodiment, the number and position of contact parts 25 inside the housing 23 may be provided in conformity with other SD standards. In this case, the mounting position of the connection terminals 33 in the electrode substrate 3 or the shape of the substrate 31 may be changed in accordance with the selected standard. Also, the contact parts 25 may be configured not to be in conformity with standards.

While the invention has been described in detail, the foregoing description is in all aspects illustrative and not restrictive. It is understood that numerous other modifications and variations can be devised without departing from the scope of the invention.

REFERENCE SIGNS LIST

1 Measuring device
2 Relay section
21 Relay board
23 Housing
231 Insertion port
25 Contact parts
3, 3a, 3b, 3c Electrode substrates
31 Substrate
33 Connection terminals
35 First working electrode
36 First reference electrode
37 Second working electrode
38 Second reference electrode
351, 361, 371, 381 Terminal parts
41 Base section
413a, 413b Through holes
43 First extension
431 First main surface (one main surface)
432 Second main surface (the other main surface)
45, 45a Second extensions
453 Outer surface (engagement surface)
47 Protruding parts (engagement parts)
47a Recessed parts (engagement parts)
471 Engagement surface
5 Removal tool
51 Recovery container
53 Lid part (removal part)
55 Opening part
551 First opening
553 Second opening
6 Culture vessel
7 Substrate holder
9 Robot arm
D1 First direction
D2 Second direction
S11 Insertion step
S12 Movement step
S13 Withdrawal step (engagement step)

The invention claimed is:

1. An electrode substrate having electrodes for measuring an electrical resistance of biological cells or tissues, comprising:
    a substrate having a base section, a first extension part extending from said base section, and a second extension part extending from said base section;
    a plurality of connection terminals provided on a surface of said base section;
    a first working electrode and a second working electrode each connected to one of said connection terminals, said first and second working electrodes being wired on a surface of said substrate; and
    an engagement surface provided on said substrate and facing toward said connection terminals in a position closer to said first extension part than said connection terminals,
    said first working electrode being wired from said base section to said first extension part,
    said second working electrode being wired from said base section to said second extension part,
    said first extension part extending in a first direction,
    said engagement surface protruding in a second direction orthogonal to said first direction away from said second extension part and beyond said first extension part, and
    said engagement surface being integrally formed with said base section.

2. The electrode substrate according to claim 1,
    wherein said engagement surface is provided on an engagement part provided on a side edge of said substrate and having a protruding shape.

3. The electrode substrate according to claim 2,
    wherein said engagement part is provided in said base section.

4. The electrode substrate according to claim 2,
    wherein said first extension part extends in said first direction from a side edge of said base section, and
    wherein said engagement part has a shape protruding in said second direction.

5. The electrode substrate according to claim 4, further comprising
    a first reference electrode and a second reference electrode each connected to one of said connection terminals, said first and second reference electrodes being wired on the surface of said substrate.

6. The electrode substrate according to claim 5,
    wherein said first reference electrode is wired from said base section to said first extension part.

7. The electrode substrate according to claim 6,
    wherein said first working electrode is wired on one main surface of said first extension part, and
    wherein said first reference electrode is wired on the other main surface opposite to said one main surface of said first extension part.

8. The electrode substrate according to claim 5,
    wherein said base section has a through hole, and
    wherein one of said first working electrode or said first reference electrode is wired from one main surface of said base section through said through hole and onto the other main surface opposite to said one main surface of said base section.

9. A measuring device for measuring an electrical resistance of biological cells or tissues, comprising:
the electrode substrate as recited in claim 1; and
a relay section to which said electrode substrate is to be removably attached,
wherein said relay section includes
a plurality of contact parts for contact with said respective connection terminals.

10. The measuring device according to claim 9,
wherein said relay section further includes
an insertion port for insertion of said base section of said electrode substrate therein, and
wherein said contact parts are provided inside said insertion port.

11. The measuring device according to claim 10,
wherein said engagement surface of said electrode substrate is exposed to the outside of said insertion port, with said base section of said electrode substrate inserted in said insertion port of said relay section.

12. The measuring device according to claim 9,
wherein said contact parts provided in said relay section are provided in conformity with an SD standard.

13. A removal tool for removing said electrode substrate from said relay section in the measuring device as recited in claim 9, comprising
a removal part provided with an opening part for insertion of said electrode substrate therein,
wherein said opening part includes
a first opening greater than part of said electrode substrate where said engagement surface is provided, and
a second opening continuous with said first opening and smaller than the part of said electrode substrate where said engagement surface is provided.

14. A measuring method for measuring an electrical resistance of biological cells or tissues by means of a measuring system,
said measuring system including an electrode substrate, a relay section to which said electrode substrate is to be attached, and a removal tool for removing said electrode substrate from said relay section,
said electrode substrate including:
a substrate having a base section, a first extension part extending from said base section, and a second extension part extending from said base section;
a plurality of connection terminals provided on a surface of said base section;
a first working electrode and a second working electrode each connected to one of said connection terminals, said first and second working electrodes being wired on a surface of said substrate; and
an engagement surface provided on said substrate and facing toward said connection terminals in a position closer to said first extension part than said connection terminals,
said first working electrode being wired from said base section to said first extension part,
said second working electrode being wired from said base section to said second extension part,
said first extension part extending in a first direction,
said engagement surface protruding in a second direction orthogonal to said first direction away from said second extension part and beyond said first extension part, and
said engagement surface being integrally formed with said base section,
said removal tool including:
a removal part provided with an opening part for insertion of said electrode substrate therein,
said opening part including:
a first opening greater than part of said electrode substrate where said engagement surface is provided; and
a second opening continuous with said first opening and smaller than the part of said electrode substrate where said engagement surface is provided, and
said method comprising the steps of:
a) inserting the part of said electrode substrate where said engagement surface is provided into said first opening, with said electrode substrate attached to said relay section;
b) moving said electrode substrate to the inside of said second opening, said step b) being performed after said step a); and
c) withdrawing said electrode substrate from said second opening to bring said second opening into engagement with said engagement surface, said step c) being performed after said step b).

\* \* \* \* \*